United States Patent

Michel et al.

[11] 4,285,702
[45] Aug. 25, 1981

[54] METHOD AND APPARATUS FOR THE RECOVERY OF WATER FROM ATMOSPHERIC AIR

[75] Inventors: Helmut Michel, Esslingen-Sulzgries; Wolfgang Bulang, Eichenau, both of Fed. Rep. of Germany

[73] Assignee: Maschinenfabrik Augsburg-Nuernberg AG, Fed. Rep. of Germany

[21] Appl. No.: 18,699

[22] Filed: Mar. 8, 1979

[30] Foreign Application Priority Data

Mar. 9, 1978 [DE] Fed. Rep. of Germany ....... 2810241

[51] Int. Cl.$^3$ .............................................. B01D 53/04
[52] U.S. Cl. .......................................... 55/33; 55/74; 55/80; 55/387
[58] Field of Search ..................... 165/10, 80 B, 80 D, 165/DIG. 4; 55/33, 74, 80, 387, 388, 267, 208; 203/DIG. 1 41, 49

[56] References Cited

U.S. PATENT DOCUMENTS

| | | | |
|---|---|---|---|
| 2,138,689 | 11/1938 | Attenkirch | 55/33 |
| 3,263,400 | 8/1966 | Hoke et al. | 55/33 |
| 4,051,891 | 10/1977 | Harrison | 165/DIG. 4 |
| 4,081,024 | 3/1978 | Rush et al. | 165/DIG. 4 |
| 4,146,372 | 3/1979 | Groth et al. | 55/33 |

FOREIGN PATENT DOCUMENTS 2624392 6/1975 Fed. Rep. of Germany .
2702701 7/1978 Fed. Rep. of Germany .............. 55/33

*Primary Examiner*—Charles N. Hart
*Assistant Examiner*—E. Rollins Cross
*Attorney, Agent, or Firm*—Schwartz, Jeffery, Schwaab, Mack, Blumenthal & Koch

[57] ABSTRACT

A method of recovering water from atmospheric air wherein during an adsorption phase, cool, humid air is transported through a water-adsorbent material for adsorption of water vapor therefrom and wherein during a desorption phase warmer, drier air is transported through the adsorbent material for pickup of water from said adsorbent material, said desorption phase comprising the steps of generating a first air stream in a closed-loop path through a heater for heating the first air stream and thence to the adsorber material and back through heater, continuing step (a) for a predetermined time, generating a second air stream by diverting a portion of the first air stream for circulation from the adsorber material through a condenser for yielding water therefrom by condensation, and joining the second air stream to the first air stream after passage of the second air stream through the condenser, whereby the second air stream may be heated by the heater and passed through the adsorbent material.

22 Claims, 2 Drawing Figures

METHOD AND APPARATUS FOR THE RECOVERY OF WATER FROM ATMOSPHERIC AIR

BACKGROUND OF THE INVENTION

1. Field of the Invention

This invention relates to a method for the recovery of water from atmospheric air, where during a first phase a first stream of cool, humid air from the atmosphere is routed through an adsorber containing a water-adsorbent medium to yield water vapor to the water-adsorbent medium. During a second phase, a circulating second air stream is heated and is then routed through the adsorber to yield heat to the water-adsorbent medium while extracting water from the water-adsorbent medium for subsequent condensation in a condenser, after which the condensed water is collected and ducted away.

2. Description of the Prior Art

Reference is made to copending application of the same assignee entitled "Process and Plant for Recovering Water from Moist Gas", Ser. No. 937,523, filed Aug. 28, 1978, incorporated herein by reference. The apparatus and method described in the aforementioned application concerns a regenerating air stream which is carried in closed-loop circulation through several serially connected heaters taking the form of sun collectors and adsorbers in alternation, and is then ducted through serially connected condensers back to the first sun collector.

SUMMARY OF THE INVENTION

A broad aspect of the present invention is to provide a method which uses only a single adsorber and which is improved such that it will recover the same if not a greater amount of water as when several serially connected adsorbers are used.

It is a particular object of the present invention to provide a method wherein, during the desorption or second phase of operation the total air stream is initially routed in circulation through the heater and the adsorber but without passing through the condenser. After a certain point in time, the air stream, after having picked up water in the adsorber, it split into two partial streams, of which the one bypasses the condenser and of which the other is routed through the condenser to yield water by condensation, and where after condensation the two partial streams are again united to be ducted jointly through the heater and thereafter through the adsorber.

The method of the present invention provides an advantage over the prior art in that the method of the present invention will yield a substantially greater amount of water.

In a further aspect of the present invention the entire air stream is carried in circulation, except through the condenser, through the heater and the adsorber until it is saturated with water vapor in keeping with its temperature raised by the supply of heat in the heater. This provision will permit the air stream when passing through the adsorber to pick up the total or nearly total amount of water carried in the water adsorbent medium.

For maximally complete condensation of the water vapor contained in the partial stream ducted to the condenser, it is useful to precool this partial stream before it enters the condenser. To keep the temperature of the one partial stream from dropping excessively when the other partial stream is admixed, it is also useful to preheat the other partial stream upon its exit from the condenser and before it is again introduced into the one partial stream. In a preferred aspect, the other partial stream is precooled and preheated, respectively, by means of a heat exchanger in that it is ducted through the heat exchanger before it enters the condenser and after it issues from the condenser.

In a further aspect of the present invention the first air stream is taken from the cool night air and the first or adsorption phase takes place during the night, the second or desorption phase taking place during the daytime. If this is the cycle selected, it is advantageous if in the first phase before entry of the first air stream into the adsorber a partial stream is diverted from the first air stream and ducted through a cold storage reservoir combined with the condenser in order to cool the cold storage reservoir, while the remainder of the first air stream passes through the adsorber. Another advantage is provided by precooling the other partial stream of the second air stream by means of the cold stored at night before it enters the condenser and/or preheat it by means of the heat stored in daytime after it issues from the condenser.

Charging the water-adsorbent medium and cooling the condenser during the night proves advantageous in that the air temperature drops at night and the relative humidity is commensurately high.

In a further aspect of the present invention the heat used for preheating the other partial stream of the second air stream is extracted from the cold storage reservoir condenser at the beginning of the first phase. This heat is preferably extracted from the cold storage reservoir condenser by ducting, in the beginning of the first phase, the other partial stream of the second air stream first through the cold storage reservoir condenser and then through the heat storage reservoir until the heat storage reservoir has attained a maximum temperature. This partial stream is thereafter still ducted through the cold storage reservoir condenser only to further reduce its temperature.

In a further aspect of the present invention an apparatus is provided for implementing the method of the present invention, said apparatus consisting of a heater, an adsorber containing the water-adsorbent medium, a condenser, an annular duct for ducting air through the heater, the adsorber and the condenser, and of at least one fan arranged in the annular duct to force the air through the annular duct, characterized by a bypass duct branching off at a point between the adsorber and the condenser which again issues into the annular duct at a point between the condenser and the heater, and by a valve provided for adjustment of the air flows through the bypass duct and through the condenser during the second phase.

In a preferred aspect the valve takes the shape of a movable flap which in a first closing position interrupts the flow in the annular duct between the adsorber and the condenser and allows passage of the air through the bypass duct, and which in a second closing position, interrupts the flow through the bypass duct and allows the passage of air in the annular duct between the adsorber and the condenser, and which in one of a plurality of intermediate positions allows the passage of a quantity of air corresponding to this intermediate position both through the bypass duct and through the annular duct in the area between the adsorber and the condenser.

It is useful to provide the condenser in the form of a combined condenser plus cold storage reservoir containing a storage medium which upon cooling or heating remains in a liquid or solid state or turns from the liquid into the solid or from the solid into the liquid state. This storage medium provides maximum storage capacity or is a medium of suitable melting temperature for utilizing the latent melting heat additionally to the thermal capacity. Use may alternatively be made also of several media of various melting points should the night temperatures be known to vary in the course of the year.

It may be helpful to interconnect a heat exchanger between the condenser air inlet and outlet for passage, when the apparatus is being operated, of the other partial stream of the second air stream during the second phase before it enters the condenser and after it issues from the condenser for the purpose of heat exchange. To control the air streams passing through the apparatus and/or circulating in it, it is useful to control the fan or fans and the valve by means of one or more temperature and humidity sensors.

In a preferred aspect a cold storage reservoir is provided for precooling the other partial stream of the second air stream flowing into the condenser and a heat storage reservoir is used for preheating the other partial stream of the second air stream issuing from the condenser.

In a preferred aspect use is made as a source of heat of the sun, and a sun collector is used as a heater. Use can alternatively be made also of other sources of heat of preferably 70° to 100° C. temperature ranges, such as waste heat from power stations or internal combustion engines. When use is made of a source of heat of this description, the heater will then take the form of a heat exchanger.

In a preferred aspect, the sun collector consists of a plurality of ducts extending downwards in parallel arrangement and the adsorber containing the water-adsorbent medium is arranged directly below the sun collector. This makes for maximally effective conversion of the solar energy into heat by multiple reflection, and the mirror surface of the collector material prevents the reflection of heat. Also, heat radiated by the collector is fed to the water-adsorbent medium and the air stream heated by the collector is immediately ducted to the adsorber to prevent heat losses. Mirror surfaces are provided above the sun collector to intensify incident solar radiation.

BRIEF DESCRIPTION OF THE DRAWINGS

A preferred embodiment of the invention is described below in light of the accompanying drawings, in which.

DETAILED DESCRIPTION OF THE PREFERRED EMBODIMENT

Figure 1:
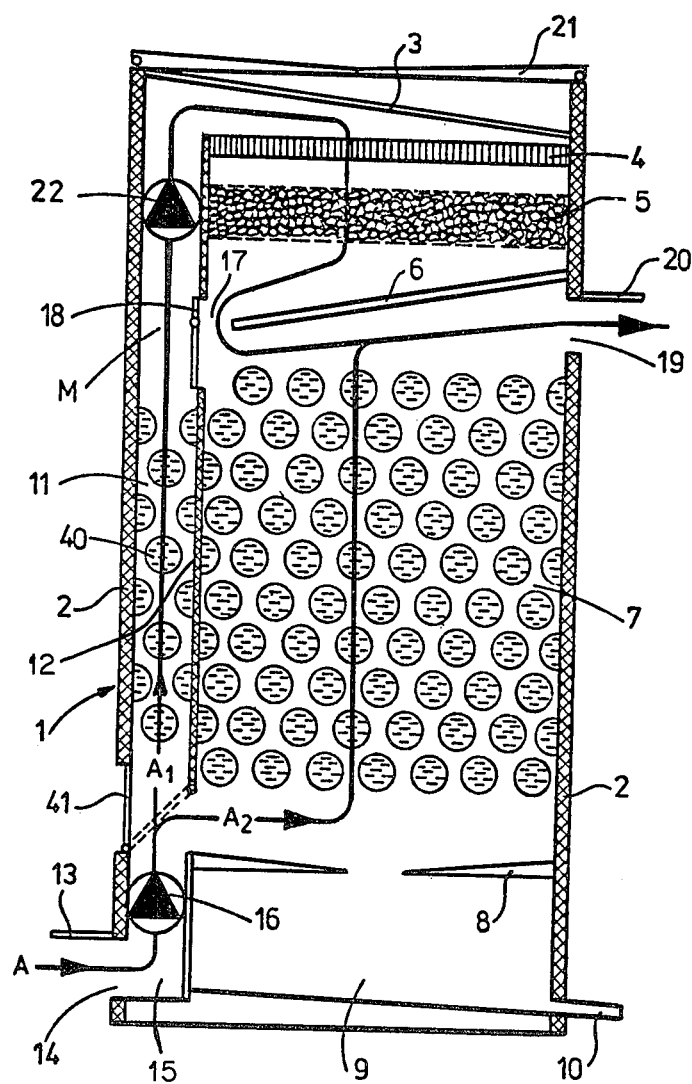
FIG. 1 is a diagramatic view of a water recovery apparatus arranged in accordance with the present invention and operable during the first or adsorption phase.

A water recovery apparatus arranged in accordance with the present invention consists of a casing 1 having vertical walls 2 and an upper translucent cross cover 3. Arranged within the casing are, starting at the top and proceeding downwards, a sun collector 4, an adsorber bed 5 containing the water-adsorbent medium, an air baffle 6, and a cold storage reservoir condenser 7 containing a heat-retaining medium. Arranged below the condenser 7 is a cross-grate 8 forming the upper cover of a collector tank 9. The collector tank 9 is fitted with a water drain pipe 10. The sun collector 4, the adsorber bed 5, the air baffle 6 and the cold storage reservoir condenser 7 are arranged in an annular duct 11 limited by the vertical walls 2 of the casing 1, the upper translucent cover 3, the grate 8 and a vertical partition 12. Arranged at the lower end of the casing 1 is an air inlet port 14 closed by a flap 13, said inlet port followed in the interior of the casing 1 by an air inlet duct 15 issuing into the annular duct 11. Arranged in the air inlet 15 is a first fan 16 serving to draw air from the atmosphere and through the inlet port 14 and force it into the annular duct 11. The partition 12 incorporates a passage 17 between the adsorber bed 5 and the condenser 7 in the area of the air baffle 6, with an adjustable flap 18 arranged in said passage. The flap 18 cooperates with the air baffle 6 and the partition 12 such that in a first closing position it interrupts the flow in the annular duct 11 between the air baffle 6 and the partition 12 and allows the flow of air through the passage 17 or the bypass duct and that it, in a second closing position (FIG. 1), interrupts the flow through the passage 17 or bypass duct and allows the flow of air in the annular duct 11 between the air baffle 6 and the partition 12. The flap 18 can be locked in a plurality of intermediate positions in which the passage 17 and the annular duct 11 are partially open in the area of the air baffle 6. The casing 1 incorporates an air outlet port 19 between the air baffle 6 and the condenser 7 with a flap 20 to close it. Pivotally arranged above the translucent cover 3 are mirrors 21 which when in the deployed position deflect the sun beams to the collector 4 (see FIG. 2) and which when in the folded position may serve as cover plates for the sun collector should the weather make it necessary (FIG. 1). A second fan 22 is arranged in the annular duct 11 in the area between the flap 18 and the upper translucent cover 3 on the side of the partition 12 which points away from the adsorber bed. It serves to force the air in closed-loop circulation through the sun collector 4, the adsorber bed 5, the passage 17 and back to the sun collector. The sun collector 4 consists of a plurality of ducts in parallel arrangement. As a water-adsorbent medium, use is made of silica gel, and the storage medium used is water. As a storage medium, use can alternatively be made of mixtures of Glauber salt and sodium chloride and other eutectic mixtures of salt hydrates.

Figure 2:
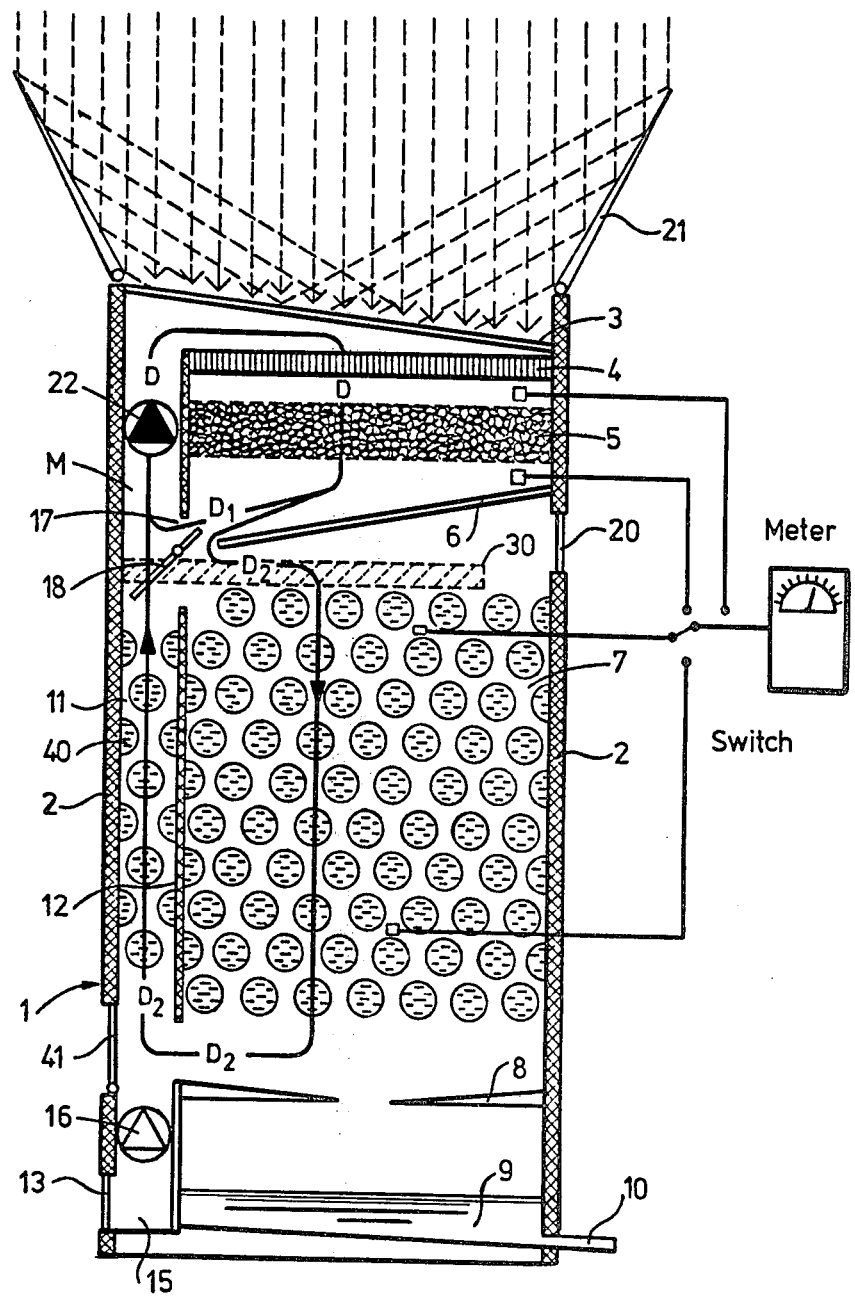
FIG. 2 illustrates the apparatus shown in FIG. 1 in operation during the second or desorption phase.

The water recovery apparatus of FIGS. 1 and 2 operates as follows:

In a first phase taking place during the night (see FIG. 1) the flaps 13 and 20 are in their respective open position and the mirrors 21 are in their folded position. The flap 18 is in its second closing position in which it interrupts the flow through the passage 17 and allows the flow of air between the air baffle 6 and the partition 12. Both fans 16 and 22 are in operation. The fan 16 draws in a water vapor laden air stream A from the cool night air. The air stream A is split into two partial streams A1 and A2, of which the partial stream A1 is carried through the adsorber bed 5, where the water-adsorbent medium in the adsorber bed is charged with water vapor from the partial stream A1 and where the partial stream A1 carries away the bond energy liberated. The second partial stream A2 is carried through the condenser plus heat storage reservoir 7 to cool the storage medium contained in it. The two partial streams A1 and A2 again unite in the area between the air baffle 6 and the cold storage reservoir condenser 7 and issue from the apparatus through the air outlet port 19.

In a second phase, taking place during daytime (see FIG. 2), the water recovery apparatus is operated for regenerating the adsorber 5 and for condensing the water desorbed in the process. In this phase the flaps 13 and 20 are in their respective closing position, the mirrors 21 are deployed to deflect the incident sun beams on to the sun collector, which heats up in the process, the fan 16 is switched off, and the fan 22 is running. The flap 18 is initially in its first closing position, when it interrupts the flow of air in the area between the air baffle 6 and the partition 12, and allows the flow of air through the passage 17. The fan 22 propels a stream of air D circulating in the upper portion of the apparatus through the sun collector 4 and the adsorber bed 5. The air stream D picks up heat in the sun collector 4, gaining temperature in the process, and then partially relinquishes this heat to the adsorber, heating the water-adsorbent medium. The heating of the water-adsorbent medium causes a portion of the water picked up by the water-adsorbent medium during the first phase to be desorbed. The desorbed water is picked up by the air stream D as it flows through the adsorber 5. When the temperature of the air stream D and of the water-adsorbent medium has been sufficiently raised by repeated flow through the sun collector 4 and the adsorber 5 and when the air stream D has been saturated with water in keeping with its raised temperature, the flap 18 is rotated into a preselected intermediate position as shown in FIG. 2 permitting a partial stream D1 of the air stream D to continue its circulation through the passage 17, the sun collector 4 and the adsorber 5, and a second partial stream D2 to be directed to the condenser. The flow rates of the two partial flows D1 and D2 are determined by the position of the flap 18. The partial stream D2 flows through the cold storage reservoir condenser 7 in a downward direction, is brought to a low temperature in the process, and relinquishes a portion of the water vapor by condensation. The condenser plus cold storage reservoir picks up the liberated heat of condensation, which it yields later in the first or adsorption phase. The cooled and partially dehumified partial stream D2 issues at the lower end of the condenser plus cold storage reservoir and is ducted to the mixture area M, where it mixes again with the other partial stream D1. Condensation of the water takes place in a downward direction and the condensed water trickles downwards into the collector tank 9 from which it is drained through water drain pipe 10. The mixing area M is arranged in the area between the flap 18 and the fan 22. After mixing, the two partial streams D1 and D2 are again routed as a joint air stream D through the fan 22, the sun collector 4 and the adsorber bed 5. The water picked up by the adsorbent medium during the first phase is increasingly desorbed by the air stream D and carried by the partial stream D2 to the cold storage reservoir condenser 7. Here the storage medium heats up increasingly in a downward direction in keeping with the heat of condensation adsorbed. As a result of the continuous circulation of the air stream D in the manner claimed in the present invention in two communicating circuits in the apparatus arranged in accordance with the present invention the water carried in the water-adsorbent medium is desorbed in almost its entirety, is condensed in the cold storage reservoir condenser 7 and is collected in the water tank 9.

The force of the air streams D, D1 and D2 circulating in the apparatus during the desorption and condensation phases is controlled by the fans 16 and 22 and by the flap 18.

The apparatus lends itself to expansion by serially connecting as needed several modules formed in accordance with the apparatus just described.

The apparatus of the present invention can alternatively be fitted with a horizontal-flow condenser where a requirement exists for low overall height as perhaps in apparatuses of prefabricated modules.

The apparatus of the present invention can alternatively be modified to include an additional heat exchanger indicated at 30 to cool the air stream D2 before it enters the condenser and heat the air stream D2 upstream of the mixing area M. This heating of the air stream D2 can additionally or alternatively be effected by a heat storage reservoir 40 charged with heat stored in the cold storage reservoir condenser during the condensation phase. The charging of the heat storage reservoir with the heat stored in the cold storage reservoir condenser during the condensation phase can be effected such that the air stream A2 is first ducted through the cold storage reservoir condenser and then through the heat storage reservoir 40, causing the cold storage reservoir condenser to cool in the process and the heat storage reservoir 40 to gain temperature. The air stream A2 is ducted through the cold storage reservoir condenser and the heat storage reservoir until the temperature of the heat storage reservoir is a maximum. If the air stream A2 would be routed through the heat storage reservoir beyond this point in time, the temperature of the heat storage reservoir 40 would again begin to drop. In this phase the flap 20 is closed and the flaps 18 and 41 are turned in such a position that the stream A2 passes the flap 18, the heat-exchanger 40 and the flap 41. During the charging period of the heat-exchanger 40 the stream A1 is ducted in the same direction as the stream A2.

While the present invention has been described with regard to a particular embodiment, modifications may readily be made by those skilled in the art, and it is intended that the claims cover any such modifications which fall within the spirit and scope of the invention.

What is claimed is:

1. A method of recovering water from atmospheric air wherein during an adsorption phase, cool, humid air is transported through a water-adsorbent material for adsorption of water vapor therefrom and wherein during a desorption phase warmer, drier air is transported through said adsorbent material for pickup of water from said adsorbent material, said desorption phase comprising the steps of:
    (a) generating a first air stream in a closed-loop path through a heater for heating said first air stream and thence to said adsorber material and back through heater,
    (b) continuing step (a) for a predetermined time,
    (c) generating a second air stream by diverting a portion of said first air stream for circulation from said adsorber material through a condenser for yielding water therefrom by condensation, and
    (d) joining said second air stream to said first air stream after passage of said second air stream through said condenser, whereby said second air stream may be heated by said heater and passed through said adsorbent material.

2. A method as recited in claim 1 further comprising the step of saturating said first air stream with water vapor by passing same through said heater and adsorbent material in said closed loop path.

3. A method as recited in claim 1 further comprising the step of precooling said second air stream before passing same to said condenser.

4. A method as recited in claim 1 further comprising the step of preheating said second air stream after said air stream leaves said condenser and prior to its joining with said first air stream.

5. A method as recited in claim 1 wherein the step of transporting said air in said adsorption phase takes place at night using relatively cool, humid air and wherein the step of transporting said air during said desorption phase takes place during the daytime using relatively warmer, drier air.

6. A method as recited in claim 1 wherein said adsorption phase comprises the steps of:
(a) dividing an input air stream into a first and second air flow portion,
(b) passing said first air flow portion through said heater and thence to said water-adsorption material, and
(c) passing said second air flow portion through a cold storage reservoir which is combined with said condenser for cooling said cold storage reservoir.

7. A method as recited in claim 3 wherein said precooling step is achieved by cooling said second air stream with cold stored during the night.

8. A method as recited in claim 4 wherein said preheating step is achieved by heating said second air stream with heat stored during the daytime.

9. A method as recited in claim 8 wherein said heating is achieved using a cold storage reservoir which is combined with said condenser at the beginning of said adsorption phase.

10. A method as recited in claim 9 wherein at the beginning of the adsorption phase the second air flow portion is routed first through said cold storage reservoir condenser and then through a heat storage reservoir until the heat storage reservoir has attained a maximum temperature and thereafter, said air flow portion is routed through the cold storage reservoir condenser only to again reduce its temperature.

11. Apparatus for recovering water from atmospheric air wherein during an adsorption phase, cool, humid air is transported through a water-adsorbent material for adsorption of water vapor therefrom and wherein during a desorption phase warmer, drier air is transported through said adsorbent material for pickup of water from said adsorbent material, said apparatus comprising:
(a) air heating means,
(b) a water-adsorbent material positioned below said air heating means and in fluid communication therewith,
(c) an air baffle positioned below said adsorbent material,
(d) a condenser positioned below said air baffle,
(e) an air conduit extending from a lower region of said condenser to an upper region of said air heating means for providing an air communication path connecting said condenser to said heating means,
(f) a fan for forcing air through said air conduit,
(g) a bypass duct positioned in a region adjacent said air baffle and between said adsorbent material and said condenser, said bypass duct connecting with said air conduit, and
(h) valve means for controlling the amount of air through said bypass duct and through said condenser.

12. Apparatus as recited in claim 11 wherein said valve means is positioned within said bypass duct and cooperating with said air baffle for simultaneously controlling the amount of air passing through said bypass duct and through said condenser.

13. Apparatus as recited in claim 12 wherein said valve means is operable to close said bypass duct during said adsorption phase.

14. Apparatus as recited in claim 12 wherein said valve means comprises a movable flap having: (1) a first position which interrupts air flow between said adsorbent material and said condenser but allows air flow in a path through said adsorbent material, said bypass duct, said heating means and back to said adsorbent material, (2) a second position for blocking air flow in said bypass duct but permitting air flow in a path through said adsorbent material, said condenser, said air conduit, said heating means and back to said adsorbent material, and (3) a plurality of intermediate positions for adjustably permitting air flow along both of said paths permitted by said first and second positions.

15. Apparatus as recited in claim 14 wherein the condenser is formed as a combined condenser/cold storage reservoir containing a storage medium which upon cooling or heating remains in the liquid or solid state or turns from the liquid to the solid or from the solid to the liquid state.

16. Apparatus as recited in claim 14 further comprising a first heat exchanger positioned upstream of said condenser and a second heat exchanger positioned downstream of said condenser.

17. Apparatus as recited in claim 14 further comprising an additional fan for forcing air through said apparatus.

18. Apparatus as recited in claim 17 further comprising temperature and humidity sensors for use in controlling the position of said movable flap.

19. Apparatus as recited in claim 18 wherein said temperature and humidity sensors are utilized for controlling said fan and additional fan.

20. Apparatus as recited in claim 11 wherein said air heating means comprises solar collecting means.

21. Apparatus as recited in claim 20 wherein said solar collecting means comprises a plurality of ducts extending downwardly in a parallel arrangement and positioned immediately above said adsorbent material.

22. Apparatus as recited in claim 21 wherein said solar collecting means further comprises mirror surfaces for intensifying the solar radiation onto said plurality of ducts.

* * * * *